(12) United States Patent
Wu et al.

(10) Patent No.: US 10,162,211 B2
(45) Date of Patent: Dec. 25, 2018

(54) DISPLAY CONTROL IN DISPLAY DEVICES

(71) Applicant: Hewlett-Packard Development Company, L.P., Houston, TX (US)

(72) Inventors: Kuan-Ting Wu, Taipei (TW); Wei-Kuang Chu, Taipei (TW); Cheng-Hua Yu, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/748,870

(22) PCT Filed: Oct. 29, 2015

(86) PCT No.: PCT/US2015/057927
§ 371 (c)(1),
(2) Date: Jan. 30, 2018

(87) PCT Pub. No.: WO2017/074371
PCT Pub. Date: May 4, 2017

(65) Prior Publication Data
US 2018/0224693 A1    Aug. 9, 2018

(51) Int. Cl.
*G02F 1/1335* (2006.01)
*G02F 1/1333* (2006.01)
*G02F 1/1343* (2006.01)

(52) U.S. Cl.
CPC ...... *G02F 1/133512* (2013.01); *G02F 1/1343* (2013.01); *G02F 1/13338* (2013.01);
(Continued)

(58) Field of Classification Search
CPC ............................................. G02F 1/133512
See application file for complete search history.

(56) References Cited

U.S. PATENT DOCUMENTS 6,765,550 B2    7/2004  Janick et al.
8,057,715 B2    11/2011 Foley et al.
(Continued)

FOREIGN PATENT DOCUMENTS

KR    1020110045803    5/2011
KR    10-2015-0007998   1/2015
WO    2010016843       2/2010

OTHER PUBLICATIONS

Gass et al., "Privacy LCD Technology for Cellular Phones," 2007, retrieved from the internet [http://www.sle.sharp.co.uk/sharp/apps/sle-web/research/displays_embedded_systems/file3.pdf], 5 pages.
(Continued)

*Primary Examiner* — Edmond Lau
(74) *Attorney, Agent, or Firm* — HPI Patent Department

(57) ABSTRACT

The present subject matter relates to display devices. In an example implementation, a display device comprises a display unit having color pixels and tracks of a black matrix covering spaces between the color pixels. The display device also comprises a display control layer over the display unit. The display control layer has longitudinal channels separated by transparent substrates and overlapping the tracks of the black matrix in one direction. The longitudinal channels comprise a first set of channels filled with undoped bi-stable liquid crystals to control a view angle of a display from the display unit, and a second set of channels filled with doped bi-stable liquid crystals to control absorption of blue/ultraviolet (UV) light from the display unit.

15 Claims, 5 Drawing Sheets

(52) U.S. Cl.
CPC .. *G02F 1/133509* (2013.01); *G02F 2201/086* (2013.01); *G02F 2203/62* (2013.01)

(56) References Cited

U.S. PATENT DOCUMENTS

| | | |
|---|---|---|
| 8,310,508 B2 | 11/2012 | Hekstra et al. |
| 8,804,076 B2 | 8/2014 | Lin et al. |
| 2005/0174529 A1 | 8/2005 | Fukushima et al. |
| 2010/0328778 A1 | 12/2010 | Mimura et al. |
| 2011/0299021 A1* | 12/2011 | Chen ................. C09K 19/2007 349/139 |
| 2013/0063683 A1 | 3/2013 | Lin et al. |
| 2017/0010516 A1* | 1/2017 | Shiota ..................... G02F 1/167 |

OTHER PUBLICATIONS

Internationa Searching Authority,"Search Report," issued in connection with PCT patent application No. PCT/US2015/057927, dated Jul. 28, 2016, 5 pages.

Internationa Searching Authority,"Written Opinion," issued in connection with PCT patent application No. PCT/US2015/057927, dated Jul. 28, 2016, 6 pages.

* cited by examiner

DISPLAY CONTROL IN DISPLAY DEVICES

BACKGROUND

Electronic and communication devices, such as computers, personal digitals assistants, mobile phone, and televisions, have a display device for displaying contents to users. The display device of such electronic and communication devices may include a liquid crystal display (LCD) unit, a light emitting diode (LED) display unit, an organic LED display unit, a polymer LED display unit, a plasma display unit, and such.

BRIEF DESCRIPTION OF DRAWINGS

The following detailed description references the drawings, wherein.

DETAILED DESCRIPTION

Figure 1:
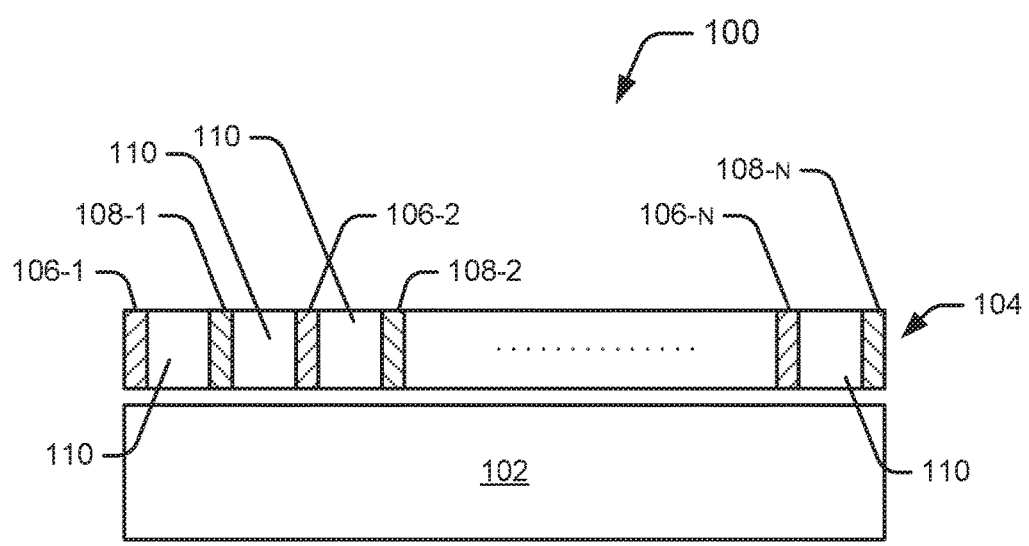
FIG. 1 illustrates a sectional view of a display device, according to an example implementation of the present subject matter.

Display devices may include liquid crystal display (LCD), light emitting diode (LED), or plasma based display units for displaying contents. Such display units have an array of color pixels that can be selectively excited for displaying the contents. The spaces between the color pixels in the array are covered or superimposed by substantially opaque crosslines, referred to as tracks of a black matrix. The tracks of the black matrix block light that may leak out through the spaces between the color pixels, thereby improving the contrast and sharpness of the displayed contents.

User devices, for example, desktop computers, laptops, tablets, and smartphones, are often utilized by users for online banking, online trading, insurance, finance, writing exams, accessing medical records, etc. Such activities involve accessing of personal data of users and displaying of such data on display devices associated with the user devices. The personal data of a user, displayed on a display device, may be sensitive to be viewed by others in the vicinity of the display device.

The display devices generally display contents with wide view angles. With wide view angles, personal data of users is visible and thus can be viewed almost from all directions in front of the display device. The wide view angles of the display device may affect security of personal data of user. Such data may have to be protected from prying eyes in the vicinity of the display device. Further, the display devices may emit blue and ultraviolet (UV) light during the display of contents. Viewing the display devices for long durations may be harmful for the eyes of the users.

The present subject matter describes display devices and methods of controlling displays on the display devices. The display devices and the methods of the present subject matter facilitate controlling of view angles of displays to protect and maintain privacy of personal data of users from prying eyes. The display devices and the methods of the present subject matter also facilitate controlling of blue/UV light absorption to protect eyes of the users from prolog viewing of the display devices.

In accordance with an example implementation of the present subject matter, the display device includes a display control layer over a display unit. The display unit has color pixels, with spaces between the color pixels covered by tracks of a black matrix. The display control layer, over the display unit, includes longitudinal channels along, and overlapping, the tracks of the black matrix in one direction. The longitudinal channels are separated by transparent substrates. Further, some of the longitudinal channels of the display control layer are filled with undoped bi-stable liquid crystals which facilitate in controlling a view angle of a display from the display unit. Other longitudinal channels of the display control layer are filled with doped bi-stable liquid crystals, with dopants that facilitate in controlling blue/UV light absorption from the display unit. The undoped bi-stable liquid crystals may include, but are not restricted to, cholesteric liquid crystals and bi-stable twisted nematic liquid crystals, and such. The dopants in the doped bi-stable liquid crystals may include, but are not restricted to, yellow color additives, blue light absorbers, and UV absorbers. In an example implementation, the longitudinal channels with the undoped bi-stable liquid crystals and the longitudinal channels with the doped bi-stable liquid crystals may are arranged within the display control layer in any combination.

For controlling the view angle of the display from the display unit, a first variable voltage may be applied across the longitudinal channels with the undoped bi-stable liquid crystals. The first variable voltage varies the tilt of the undoped bi-stable liquid crystals, thereby varying and controlling the degree of view angle of the display. The view angle can be controlled to restrict the display of the contents within a narrower angle range in front of the user, and the contents cannot be viewed from directions outside of the narrower angle range. For the purpose of controlling the blue/UV light absorption from the display unit, a second variable voltage may be applied across the longitudinal channels with the doped bi-stable liquid crystals. The second variable voltage varies the tilt of the doped bi-stable liquid crystals, thereby varying and controlling the degree of blue/UV light absorption from the display unit. Further, for the purpose of controlling the view angle and the blue/UV light absorption together, the first variable voltage may be applied across the longitudinal channels with the undoped bi-stable liquid crystals and the second variable voltage may be applied across the longitudinal channels with the doped bi-stable liquid crystals simultaneously.

With the display devices and the methods of the present subject matter, the display from the display unit can be selectively controlled for restricting the view angles of the display, absorption of the blue/UV light from the display unit, or both. Further, the degree of view angles and blue/UV light absorption can be controlled, on the fly, in real-time, by varying the voltages across the longitudinal channels. The use of bi-stable liquid crystals in the longitudinal channels of the display control layer helps in reducing the power consumption for controlling the display, as the bi-stable liquid crystals preserve their state even when the voltage across the bi-stable liquid crystals is removed. Thus, with the display devices and the methods of the present subject matter, the view angle of the display and the blue/UV light absorption can be controlled in a simple and cost effective manner.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a sectional view of a display device 100, according to an example implementation of the present subject matter. The display device 100 may be implemented in various ways. For example, the display device 100 may be implemented as monitors for desktop computers, and display screens of laptops, mobile phones, tablets, electronic readers, televisions, etc. The display device 100 includes a display unit 102 having color pixels (not shown) and a black matrix (not shown) over the color pixels. The black matrix is arranged over the color pixels such that tracks of the black matrix cover spaces between the color pixels. In an example implementation, the display unit 102 may include an LCD unit, an LED display unit, an organic LED display unit, a polymer LED display unit, a plasma display unit, and such.

The display device 100 also includes a display control layer 104 over the display unit 102. The display control layer 104 includes longitudinal channels overlapping the tracks of the black matrix in one direction. The longitudinal channels include a first set of channels 106-1, 106-2, ..., 106-$n$, and a second set of channels 108-1, 108-2, ..., 108-$n$. The channels of the first set, collectively referred to as 106, are filled with undoped bi-stable liquid crystals. The channels of the second set, collectively referred to as 108, are filled with doped bi-stable liquid crystals.

The undoped bi-stable liquid crystals may include, but are not restricted to, one of bi-stable twisted nematic liquid crystals, smectic liquid crystals, grating aligned zenithal bi-stable liquid crystals, and cholesteric liquid crystals. The doped bi-stable liquid crystals has dopants which may include, but are not restricted to, yellow color additives, blue light absorbers, and UV absorbers. The yellow color additives may be transparent or semi-transparent yellow color additives, such as iron oxide, $NiTiO_3$, lutein, cerium (IV) oxide, lead sulfochromate yellow, lead antimonate yellow, lead-tin-antimony yellow, diarylide, arylide, bisacetoacetarylide, benzimidazolone, and the like. The blue light absorbers may include, but is not restricted to, pyrophthalone. The UV absorbers may include benzophenones, anthranilates, dibenzoylmethanes, para-aminobenzoic acid (PABA) derivatives, salicylates, cinnamates and camphor derivatives of size of the order of 290-400 nm.

In the display control layer 104, the longitudinal channels, i.e., the channels 106 and 108 of the first set and the second set, are separated by transparent substrates 110. The transparent substrates 110 may include glass or plastic substrates that allow the light emitted by the display unit 102 to pass through. Each of the transparent substrates 110 may have a width in a range from about 250 µm to about 300 µm. Further, each of the longitudinal channels may have a width in a range from about 50 µm to about 100 µm. The length of the longitudinal channels may be substantially equal to the length of the tracks of the black matrix. Further, each of the longitudinal channels and each of the transparent substrates 110 may have a height in a range from about 150 µm to about 200 µm.

Although FIG. 1 shows the channels 106 with undoped bi-stable liquid crystals and the channels 108 with doped bi-stable liquid crystals being arranged alternatively; however, the channels 106 and the channels 108 can be arranged in any combination. In an example implementation, at least one channel of the first set of channels is followed by at least one channel of the second set of channels. For example, two channels 106 with the undoped bi-stable liquid crystals can be followed by two channels 108 with the doped bi-stable liquid crystals, or two channels 106 with the undoped bi-stable liquid crystals can be followed by one channel 108 with the doped bi-stable liquid crystals, and vice versa.

In an example implementation, the display device 100 can be operated in one of a view angle control mode, a blue/UV light absorption mode, and a view angle control and blue/UV light absorption mode. In the view angle control mode, a first variable voltage is provided across the channels 106 with the undoped bi-stable liquid crystals to vary the tilt of the undoped bi-stable liquid crystals and thus control the view angle of the display from the display unit 102. In the blue/UV light absorption mode, a second variable voltage is provided across the channels 108 with the doped bi-stable liquid crystals to vary the tilt of the doped bi-stable liquid crystals and thus control the absorption of blue/UV light from the display unit 102. In the view angle control and blue/UV light absorption mode, the first variable voltage is provided across the channels 106 and the second variable voltage is provided across the channels 108 to simultaneously control the view angle and control the absorption of blue/UV light.

Figure 2:
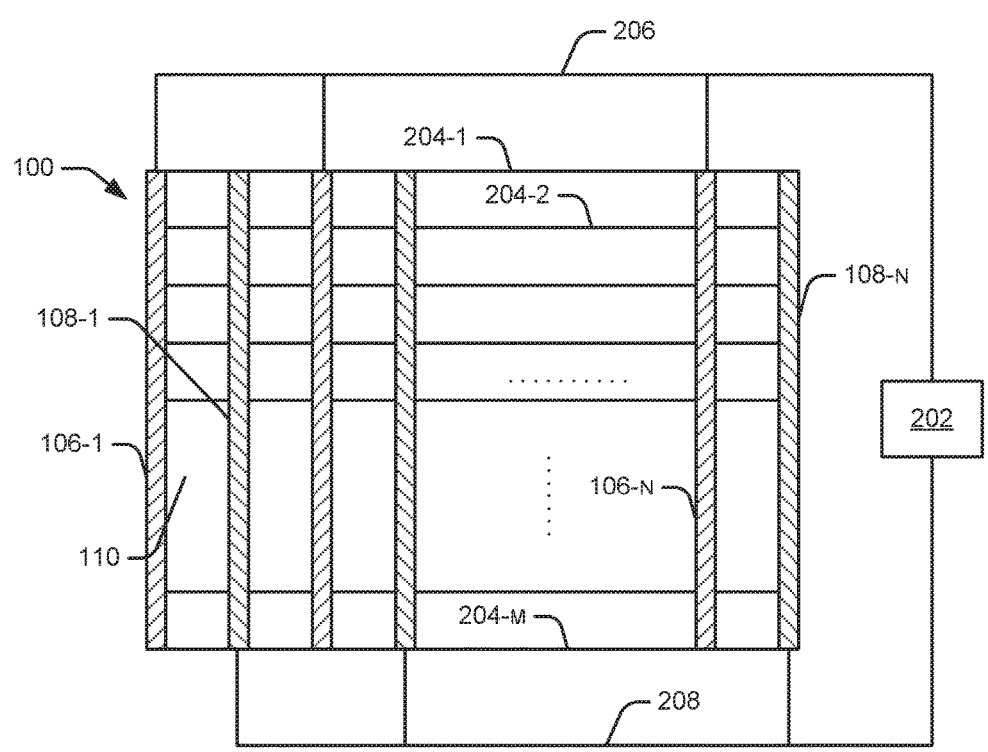
FIG. 2 illustrates a top view of the display device with a display mode controller, according to an example implementation of the present subject matter.

FIG. 2 illustrates a top view of the display device 100 with a display mode controller 202, according to an example implementation of the present subject matter. As depicted in FIG. 2, the first set of channels 106-1, ..., 106-$n$ and the second set of channels 108-1, ..., 108-$n$ are along and overlapping the tracks of the black matrix in one direction. The tracks of the black matrix in the other direction (referenced as 204-1, 204-2, ..., 204-$m$) are thus visible in FIG. 2.

The display mode controller 202 is electrically coupled to the channels 106 and 108 of the first set and the second set, and is configured to selectively operate the display device 100 in one of the view angle control mode, the blue/UV light absorption mode, and the view angle control and blue/UV light absorption mode. The display mode controller 202 is electrically coupled to the channels 106 and the channels 108 through separate electrical connection lines so that the display mode controller 202 can separately and selectively provide voltages across the channels 106 and the channels 108. The display mode controller 202 may be coupled to the channels 106 through a first electrical connection line 206 and is coupled to the channels 108 through a second electrical connection line 208, as shown in FIG. 2.

The display mode controller 202 may operate the display device 100 in the view angle control mode by providing the first variable voltage across the channels 106 through the first electrical connection line 206. The display mode controller 202 may operate the display device 100 in the blue/UV light absorption mode by providing the second variable voltage is provided across the channels 108 through the second electrical connection line 208. Further, the display mode controller 202 may operate the display device 100 in the view angle control and blue/UV light absorption mode by providing the first variable voltage across the channels 106 and the second variable voltage across the channels 108 through the respective electrical connection lines 206 and 208.

In an example implementation, the display mode controller 202 may receive a user input, referred to as a first user input, indicative of the view angle control mode, or the blue/UV light absorption mode, or the view angle control and blue/UV light absorption mode, as selected by a user. The display mode controller 202 may provide voltages across the channels 106 and/or 108 dependent on the mode selected by the user.

In an example implementation, while operating in the view angle control mode, the display mode controller 202 may receive a user input, referred to as a second user input, indicative of a specific view angle of the display. In an example, the second user input may be to restrict the view angle to ±10°, ±20°, or any other angle about a perpendicular on a plane of the display device 100. The display mode controller 202 may apply the first variable voltage across the channels 106 depending on the view angle indicated by the second user input.

Further, in an example implementation, while operating in the blue/UV light absorption mode, the display mode controller 202 may receive a user input, referred to as a third user input, indicative of a specific degree of blue/UV light absorption from the display. In an example, the third user input may be to absorb blue/UV light by 10%, 20%, or any other percentage value. The display mode controller 202 may apply the second variable voltage across the channels 108 depending on the degree of blue/UV light absorption indicated by the third user input.

Further, in an example implementation, while operating in the view angle control and blue/UV light absorption mode, the display mode controller 202 may receive a user input, referred to as a fourth user input, indicative of a specific view angle of the display, and receive another user input, referred to as a fifth user input, indicative of a specific degree of blue/UV light absorption from the display. The display mode controller 202 may apply the first variable voltage across the channels 106 and apply the second variable voltage across the channels 108 depending on the fourth user input and the fifth user input, respectively.

In an example implementation, the display mode controller 202, amongst other things, may include routines, programs, objects, components, data structures, and the like, which perform particular tasks or implement particular abstract data types. The display mode controller 202 may be coupled to, and executed by, a processor (not shown) to perform various functions for the purposes of operating the display device 100 in one of the view angle control mode, the blue/UV light absorption mode, and the view angle control and blue/UV light absorption mode, in accordance with the present subject matter. In an example implementation, the processor may be implemented as microprocessors, microcomputers, microcontrollers, digital signal processors, central processing units, state machines, logic circuitries, and/or any devices that manipulate signals based on operational instructions. Among other capabilities, the processor may fetch and execute computer-readable instructions stored in a memory coupled to the processor. The memory may be a memory of the display mode controller 202, and may include any non-transitory computer-readable storage medium including, for example, volatile memory (e.g., RAM), and/or non-volatile memory (e.g., EPROM, flash memory, NVRAM, memristor, etc.). The functions of the display mode controller 202 may be provided through the use of dedicated hardware as well as hardware capable of executing computer-readable instructions.

In an example implementation, the display control layer 104 includes transparent electrodes coupled to each of the channels 106 and 108 for providing variable voltages across the undoped bi-stable liquid crystals and the doped bi-stable liquid crystals. The transparent electrodes may be in the form of nanowires or a mesh of materials including, but not restricted to, indium tin oxide, silver, poly(3,4-ethylenedioxythiophene) polystyrene sulfonate (PEDOT:PSS), or a combination thereof. In an example implementation, the transparent electrodes can be nanotubes of carbon, graphene, PEDOT:PSS or a combination thereof.

The first electrical connection line 206 from the display mode controller 202 is electrically coupled with the channels 106 through the respective transparent electrodes, and the second electrical connection line 208 from the display mode controller 202 is electrically coupled with the channels 108 through the respective transparent electrodes.

Figure 3:
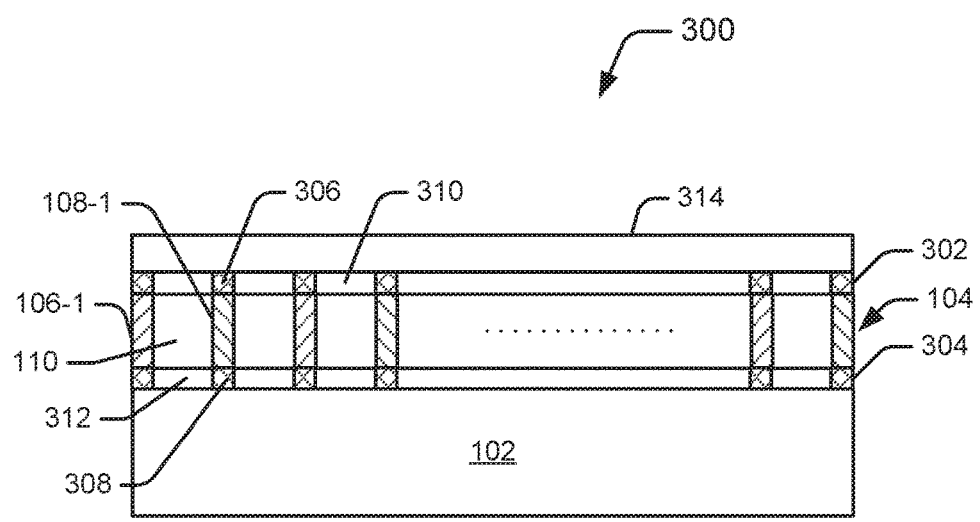
FIG. 3 illustrates a sectional view of a display device with transparent electrodes, according to an example implementation of the present subject matter.

FIG. 3 illustrates a sectional view of a display device 300 with transparent electrodes, according to an example implementation of the present subject matter. The display device 300 has a monolithic structure. As shown in FIG. 3, the display device 300 includes an upper electrodes layer 302 and a lower electrodes layer 304 across the display control layer 104, such that the transparent electrodes (e.g. 306 and 308) for each of the channels 106 and 108 are across a height of the respective channel above the display unit 102. The regions (e.g. 310 and 312) between the transparent electrodes in the upper electrodes layer 302 and the lower electrodes layer 304 are filled with electrically insulating and optically transparent material, such as polyacrylic, polycarbonate and cyclic olefin copolymer (COC) polymers. Further, the display device 300 includes a cover layer 314 over the display control layer 104. In an example implementation, the cover layer 314 is one of a cover lens, a hard transparent cover, and a touch-sensitive cover.

In an example implementation, the display control layer 104 of the display device 300 may function in a twisted nematic mode. In the display device 300, the view angle of the display can be varied from ±90° to 0° about the perpendicular from the plane of the display device 300 by providing the first variable voltage from 0 V to a first predefined voltage across the channels 106. The first predefined voltage may, for example, be 1.8 V, 3.3 V, or 5 V depending on a driving voltage associated with the display mode controller 202. By varying the voltage from 0 V to the first predefined voltage across the channels 106 in the display device 300, the undoped bi-stable liquid crystals in the channels 106 tilt from 0% to 100%, thereby varying the view angle of the display from ±90° to 0° about the perpendicular from the plane.

Similarly, in the display device 300, the degree of blue/UV light absorption can be varied from 0% to 100% by providing the second variable voltage from 0 V to a second predefined voltage across the channels 108. The second predefined voltage may, for example, be 1.8 V, 3.3 V, or 5 V depending on a driving voltage associated with the display mode controller 202. By varying the voltage from 0 V to the second predefined voltage across the channels 108 in the display device 300, the doped bi-stable liquid crystals in the channels 108 tilt from 0% to 100%, thereby varying the degree of blue/UV light absorption from 0% to 100%.

Figure 4:
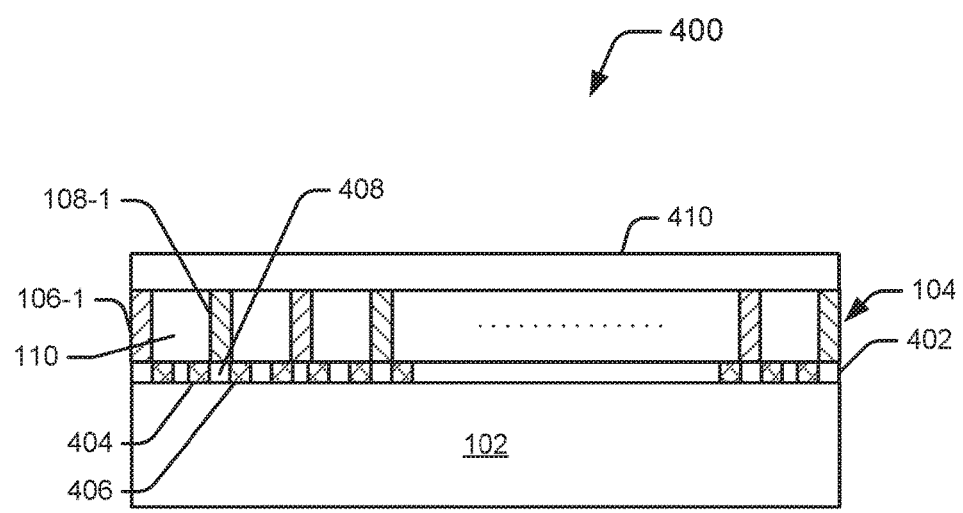
FIG. 4 illustrates a sectional view of a display device with transparent electrodes, according to an example implementation of the present subject matter.

FIG. 4 illustrates a sectional view of a display device 400 with transparent electrodes, according to an example implementation of the present subject matter. The display device 400 has a monolithic structure. The display device 400 includes a layer of electrodes 402 on one side of the display control layer 104, such that the transparent electrodes (e.g. 404 and 406) for each of the channels 106 and 108 are across a width of the respective channel. The regions (e.g. 408)

between the transparent electrodes in the layer of electrodes 402 are filled with electrically insulating and optically transparent material, such as polyacrylic, polycarbonate and cyclic olefin copolymer (COC) polymers. Further, the display device 400 includes a cover layer 410 over the display control layer 104. In an example implementation, the cover layer 410 may, for example, be a cover lens, a hard transparent cover, or a touch-sensitive cover.

In an example implementation, the display control layer 104 of the display device 400 may function in an in-plane switching mode. In the display device 400, the view angle of the display can be varied from ±90° to 0° about the perpendicular from the plane of the display device 400 by providing the first variable voltage from a first predefined voltage to 0 V across the channels 106.

The first predefined voltage may, for example, be 1.8 V, 3.3 V, or 5 V depending on a driving voltage associated with the display mode controller 202. By varying the voltage from the first predefined voltage to 0 V across the channels 106 in the display device 400, the undoped bi-stable liquid crystals in the channels 106 tilt from 0% to 100%, thereby varying the view angle of the display from ±90° to 0° about the perpendicular from the plane.

Similarly, in the display device 400, the degree of blue/UV light absorption can be varied from 0% to 100% by providing the second variable voltage from a second predefined voltage to 0 V across the channels 108. The second predefined voltage value may, for example, be 1.8 V, 3.3 V, or 5 V depending on a driving voltage associated with the display mode controller 202. By varying the voltage from the second predefined voltage to 0 V across the channels 108 in the display device 400, the doped bi-stable liquid crystals in the channels 108 tilt from 0% to 100%, thereby varying the degree of blue/UV light absorption from 0% to 100%.

Figure 5:
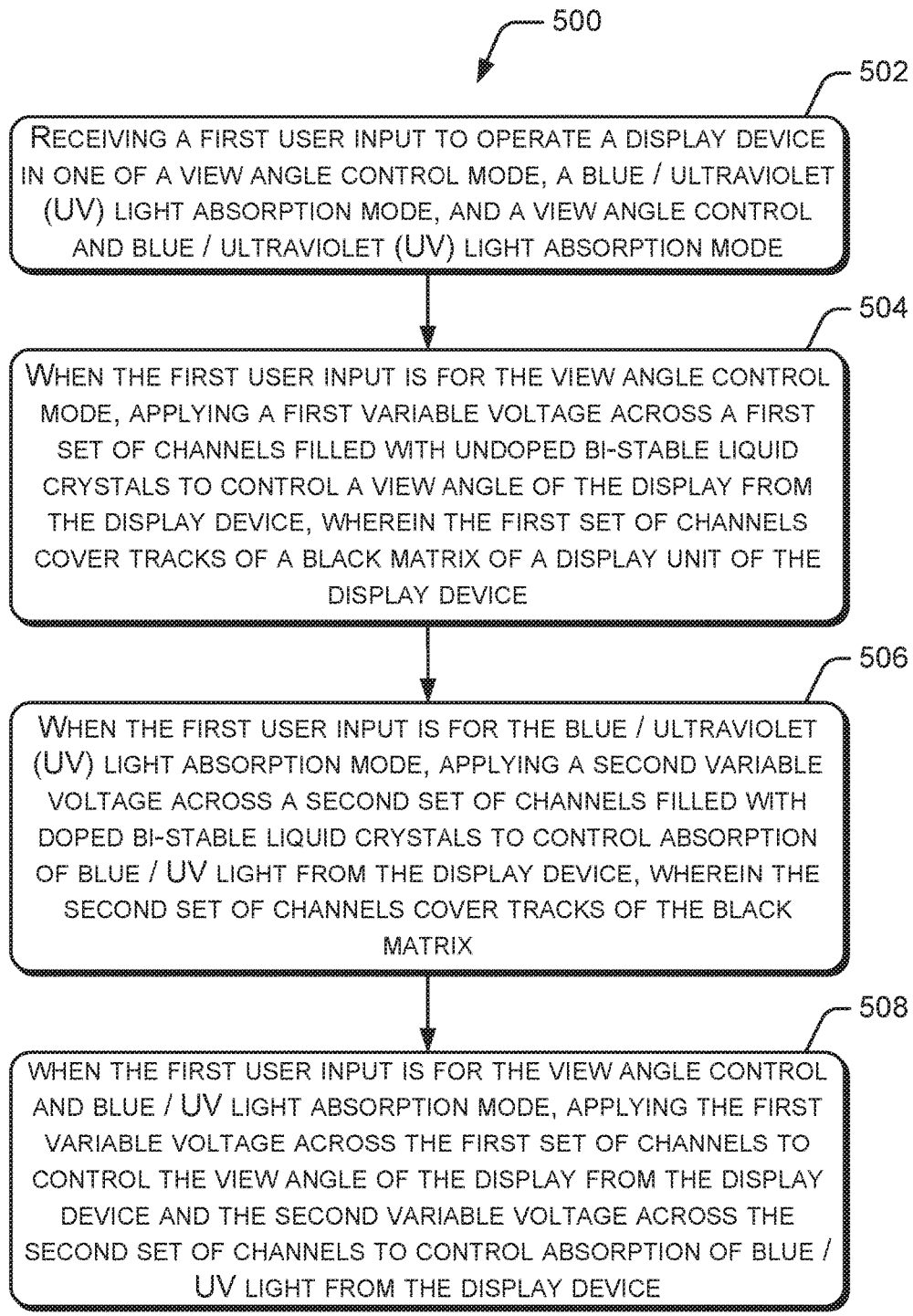
FIG. 5 illustrates a method of controlling a display from a display device, according to an example implementation of the present subject matter.

FIG. 5 illustrates a method 500 of controlling a display from a display device 100, according to an example implementation of the present subject matter. The method 500 can be implemented by processor(s) or computing device(s) through any suitable hardware, a non-transitory machine readable medium, or combination thereof. Further, although the method 500 is described in context of the aforementioned display mode controller 202 coupled to the display device 100, other suitable computing devices or systems may be used for execution of the method 500. It may be understood that processes involved in the method 500 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 5, at block 502, a first user input is received by the display mode controller 202 to operate the display device 100 in one of a view angle control mode, a blue/ultraviolet (UV) light absorption mode, and a view angle control and blue/ultraviolet (UV) light absorption mode. A user may provide the first user input directly, or through a user interface to the display mode controller 202.

At block 504, a first variable voltage is applied across the first set of channels by the display mode controller 202 to control a view angle of the display from the display device 100 when the first user input is for the view angle control mode. At block 506, a second variable voltage is applied across the second set of channels by the display mode controller 202 to control absorption of blue/UV light from the display device 100 when the first user input is for the blue/ultraviolet (UV) light absorption mode. Further, at block 508, the first variable voltage is applied across the first set of channels by the display mode controller 202 to control the view angle of the display from the display device 100 and the second variable voltage is applied across the second set of channels by the display mode controller 202 to control absorption of blue/UV light from the display device 100 when the first user input is for the view angle control and blue/UV light absorption mode.

In an example implementation, in the view angle control mode, a second user input indicative of the view angle of the display may be received by the display mode controller 202, and the first variable voltage is applied across the first set of channels depending on the second user input. Further, in the blue/UV light absorption mode, a third user input indicative of a degree of blue/UV light absorption may be received by the display mode controller 202, and the second variable voltage is applied across the second set of channels depending on the third user input. Further, in the view angle control and blue/UV light absorption mode, a fourth user input indicative of the view angle of the display and a fifth user input indicative of a degree of blue/UV light absorption may be received by the display mode controller 202, and the first variable voltage is applied across the first set of channels depending on the fourth user input and the second variable voltage is applied across the second set of channels depending on the fifth user input.

In an example implementation, the method 500 may be implemented through a set of computer readable instructions in a non-transitory computer readable medium for controlling the display from the display device 100. The set of computer readable instructions can be accessed by a computer and subsequently executed to perform acts for controlling the display from the display device 100.

Although implementations for display devices and methods of controlling displays from the display devices have been described in language specific to structural features and/or methods, it is to be understood that the present subject matter is not limited to the specific features or methods described. Rather, the specific features and methods are disclosed and explained as example implementations for display devices and methods of controlling displays from the display devices.

We claim:
1. A display device comprising:
a display unit having color pixels and tracks of a black matrix covering spaces between the color pixels; and
a display control layer over the display unit, the display control layer comprising longitudinal channels separated by transparent substrates and overlapping the tracks of the black matrix in one direction, wherein the longitudinal channels comprise:
a first set of channels filled with undoped bi-stable liquid crystals to control a view angle of a display from the display unit; and
a second set of channels filled with doped bi-stable liquid crystals to control absorption of blue/ultraviolet (UV) light from the display unit.
2. The display device as claimed in claim 1, comprising a display mode controller electrically coupled to the first set of channels and the second set of channels, wherein
in a view angle control mode, the display mode controller is to provide a first variable voltage across the first set of channels;
in a blue/UV light absorption mode, the display mode controller is to provide a second variable voltage across the second set of channels; and in a view angle control and blue/UV light absorption mode, the display mode controller is to provide the first variable voltage across the first set of channels and provide the second variable voltage across the second set of channels.

3. The display device as claimed in claim 1, wherein the first set of channels and the second set of channels are arranged such that at least one channel of the first set of channels is followed by at least one channel of the second set of channels.

4. The display device as claimed in claim 1, wherein the undoped bi-stable liquid crystals comprise one of bi-stable twisted nematic liquid crystals, smectic liquid crystals, grating aligned zenithal bi-stable liquid crystals, and cholesteric liquid crystals.

5. The display device as claimed in claim 1, wherein the doped bi-stable liquid crystals comprise yellow color additives, blue light absorbers, and UV absorbers.

6. The display device as claimed in claim 1, wherein each of the longitudinal channels has a width in a range from about 50 μm to about 100 μm.

7. The display device as claimed in claim 1, wherein each of the transparent substrates has a width in a range from about 250 μm to about 300 μm.

8. The display device as claimed in claim 1, wherein each of the longitudinal channels and each of the transparent substrates have a height in a range from about 150 μm to about 200 μm.

9. A display device comprising:
a display unit having color pixels and tracks of a black matrix covering spaces between the color pixels; and
a display control layer over the display unit, comprising:
a first set of channels filled with undoped bi-stable liquid crystals, and a second set of channels filled with doped bi-stable liquid crystals, wherein channels of the first set and the second set of channels are separated by transparent substrates and overlap the tracks of the black matrix in one direction; and
transparent electrodes coupled to each channel of the first set and the second set of channels for providing variable voltages across the undoped bi-stable liquid crystals to control a view angle of a display from the display unit and across the doped bi-stable liquid crystals to control absorption of blue/ultraviolet (UV) light from the display unit.

10. The display device as claimed in claim 9, comprising a display mode controller electrically coupled to the transparent electrodes, wherein
in a view angle control mode, the display mode controller is to provide a first variable voltage across the first set of channels through respective transparent electrodes;
in a blue/UV light absorption mode, the display mode controller is to provide a second variable voltage across the second set of channels through respective transparent electrodes; and
in a view angle control and blue/UV light absorption mode, the display mode controller is to provide the first variable voltage across the first set of channels and provide the second variable voltage across the second set of channels through respective transparent electrodes.

11. The display device as claimed in claim 9, comprising a cover layer over the display control layer, wherein the cover layer is one of a cover lens, a hard transparent cover, and a touch-sensitive cover.

12. The display device as claimed in claim 9, wherein the transparent electrodes for each channel are across a height of a respective channel.

13. The display device as claimed in claim 9, wherein the transparent electrodes for each channel are across a width of a respective channel.

14. A method of controlling a display from a display device, the display device comprising a display unit having color pixels and tracks of a black matrix covering spaces between the color pixels, wherein the tracks of the black matrix in one direction are covered by a first set of channels filled with undoped bi-stable liquid crystals and a second set of channels filled with doped bi-stable liquid crystals, wherein channels of the first set and the second set of channels are separated by transparent substrates, the method comprising:
receiving, by a computing device, a first user input to operate the display device in one of a view angle control mode, a blue/ultraviolet (UV) light absorption mode, and a view angle control and blue/ultraviolet (UV) light absorption mode;
when the first user input is for the view angle control mode, applying, by the computing device, a first variable voltage across the first set of channels to control a view angle of the display from the display device;
when the first user input is for the blue/ultraviolet (UV) light absorption mode, applying, by the computing device, a second variable voltage across the second set of channels to control absorption of blue/UV light from the display device; and
when the first user input is for the view angle control and blue/UV light absorption mode, applying, by the computing device, the first variable voltage across the first set of channels to control the view angle of the display from the display device and the second variable voltage across the second set of channels to control absorption of blue/UV light from the display device.

15. The method as claimed in claim 14, comprising:
in the view angle control mode, receiving a second user input indicative of the view angle of the display, and applying the first variable voltage across the first set of channels depending on the second user input;
in the blue/UV light absorption mode, receiving a third user input indicative of a degree of blue/UV light absorption, and applying the second variable voltage across the second set of channels depending on the third user input; and
in the view angle control and blue/UV light absorption mode, receiving a fourth user input indicative of the view angle of the display and a fifth user input indicative of a degree of blue/UV light absorption, and applying the first variable voltage across the first set of channels depending on the fourth user input and the second variable voltage across the second set of channels depending on the fifth user input.

* * * * *